United States Patent [19]

Charman

[11] Patent Number: 4,631,881

[45] Date of Patent: Dec. 30, 1986

[54] OFFICE SCREENS AND PARTITIONS

[75] Inventor: Michael D. Charman, Dartford, United Kingdom

[73] Assignee: Vickers Public Limited Company, London, England

[21] Appl. No.: 854,476

[22] Filed: Apr. 22, 1986

Related U.S. Application Data

[63] Continuation-in-part of Ser. No. 751,046, Jul. 2, 1985, abandoned.

[30] Foreign Application Priority Data

Apr. 30, 1985 [GB] United Kingdom ................. 8510909

[51] Int. Cl.⁴ ............................................. E04F 19/06
[52] U.S. Cl. .................................... 52/220; 52/238.1; 174/48; 160/135
[58] Field of Search ....................... 52/220, 221, 238.1; 174/48, 49; 160/135, 351

[56] References Cited

U.S. PATENT DOCUMENTS

| | | | |
|---|---|---|---|
| 1,990,259 | 2/1935 | Walters | 52/479 |
| 2,027,882 | 1/1936 | Ross | 52/506 |
| 2,066,205 | 12/1936 | Keating | 52/506 |
| 3,195,698 | 7/1965 | Codrea | 52/239 |
| 3,471,629 | 10/1969 | O'Leary | 174/49 |
| 3,537,217 | 11/1970 | Lickliter et al. | 52/126.4 |
| 4,535,577 | 8/1985 | Tenser et al. | 174/48 |

FOREIGN PATENT DOCUMENTS 1149500 7/1957 France ................................. 52/509

Primary Examiner—James L. Ridgill, Jr.
Attorney, Agent, or Firm—Shoemaker and Mattare, Ltd.

[57] ABSTRACT

An office partition is formed by interconnection at adjacent posts of screens each comprising a load-carrying frame of posts and rails. Cladding panels are demountably supported on each face of the frame at an outward clearance from the posts and rails. Each cladding panel has on its concealed face a pair of horizontally spaced frame members formed with lower and upper slots to engage respectively with (a) out-turned tongues of hinge clips on the lower of said pair of rails, and (b) by means of spring latch in the upper of said slots with catches under the upper of said pair of rails. At least one cable carrier in the screen extends along and is supported by a rail, so that electrical wiring laid in the cable carrier of one screen can pass out of the screen in the gap between a panel and a post or rail and can pass in the gap between the panels and the posts across the posts to the cable carrier of the adjoining screen. The partition may be used in association with a desk that stands against or is supported by the partition, which is provided with one or more cable carriers as aforesaid defining open channels for lay-in electrical cables that run along the screen above the desk. A latched cladding panel immediately above the desk defines an access panel that is held closely spaced from a frame of the screen to permit cables to pass from the channel or channels onto the desk and opens to expose the channels.

26 Claims, 23 Drawing Figures

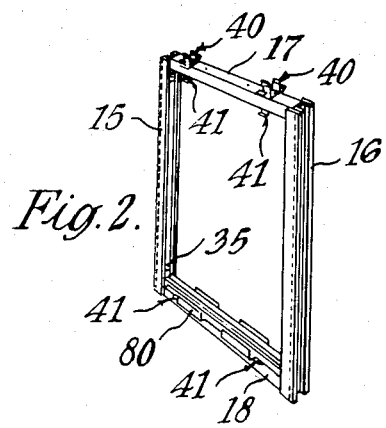
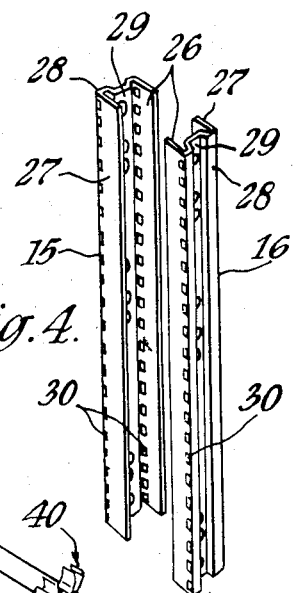
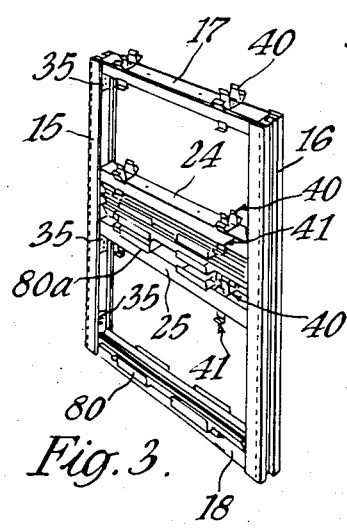
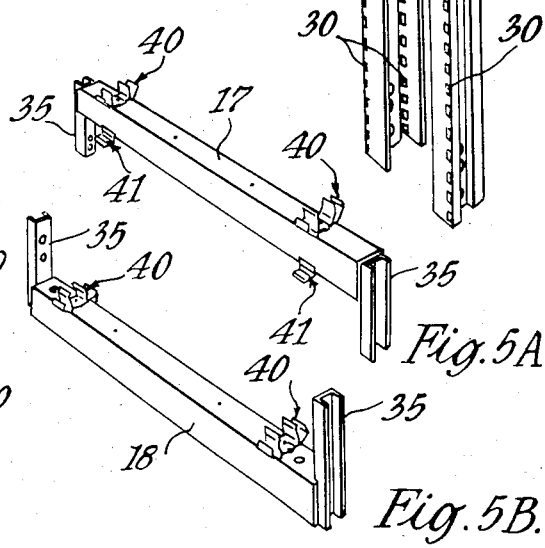
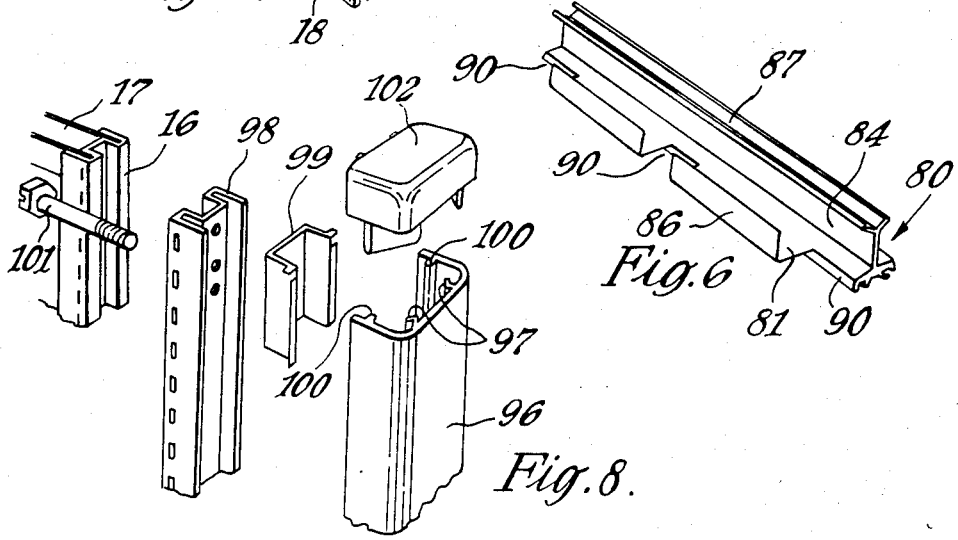

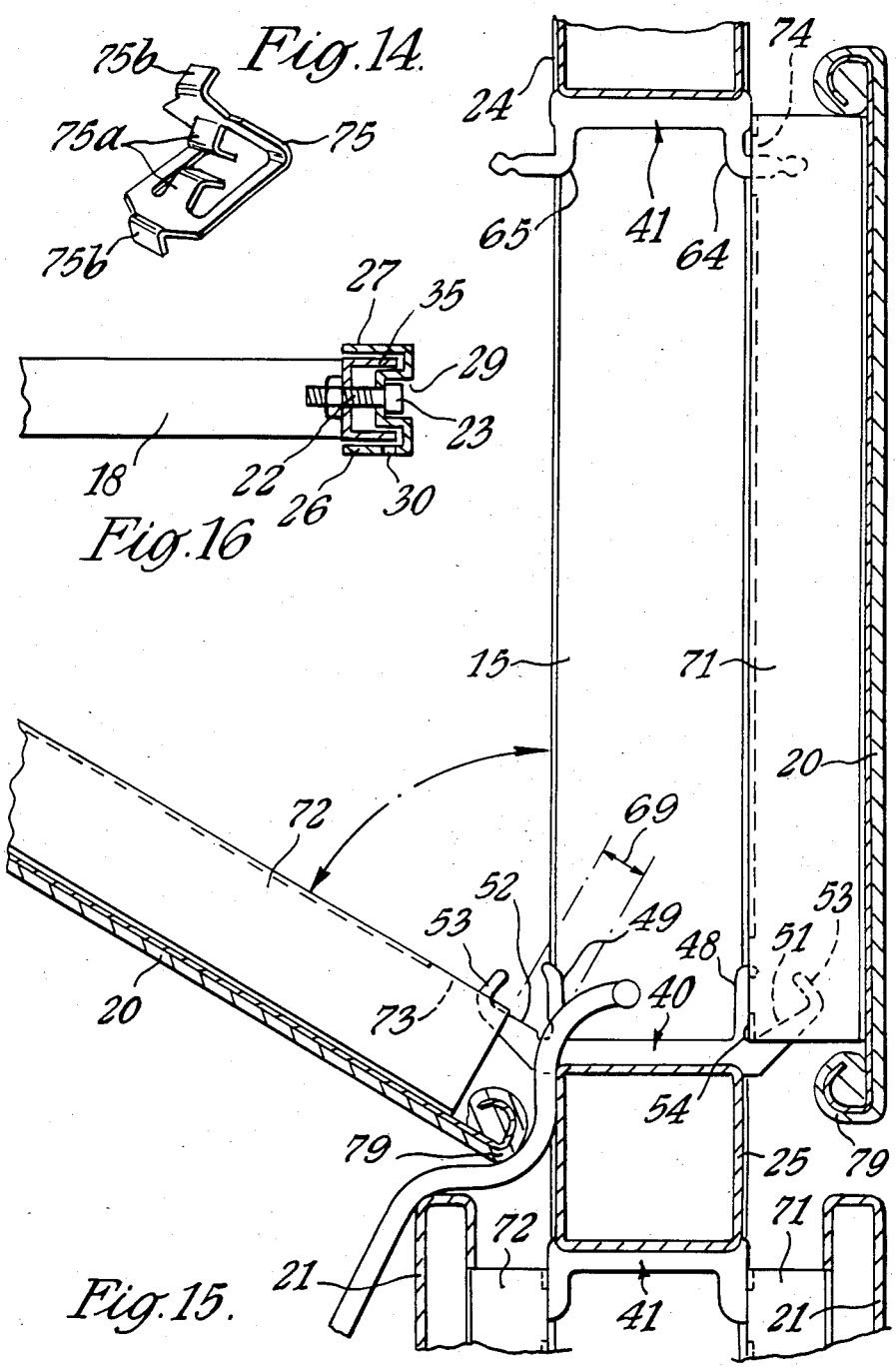

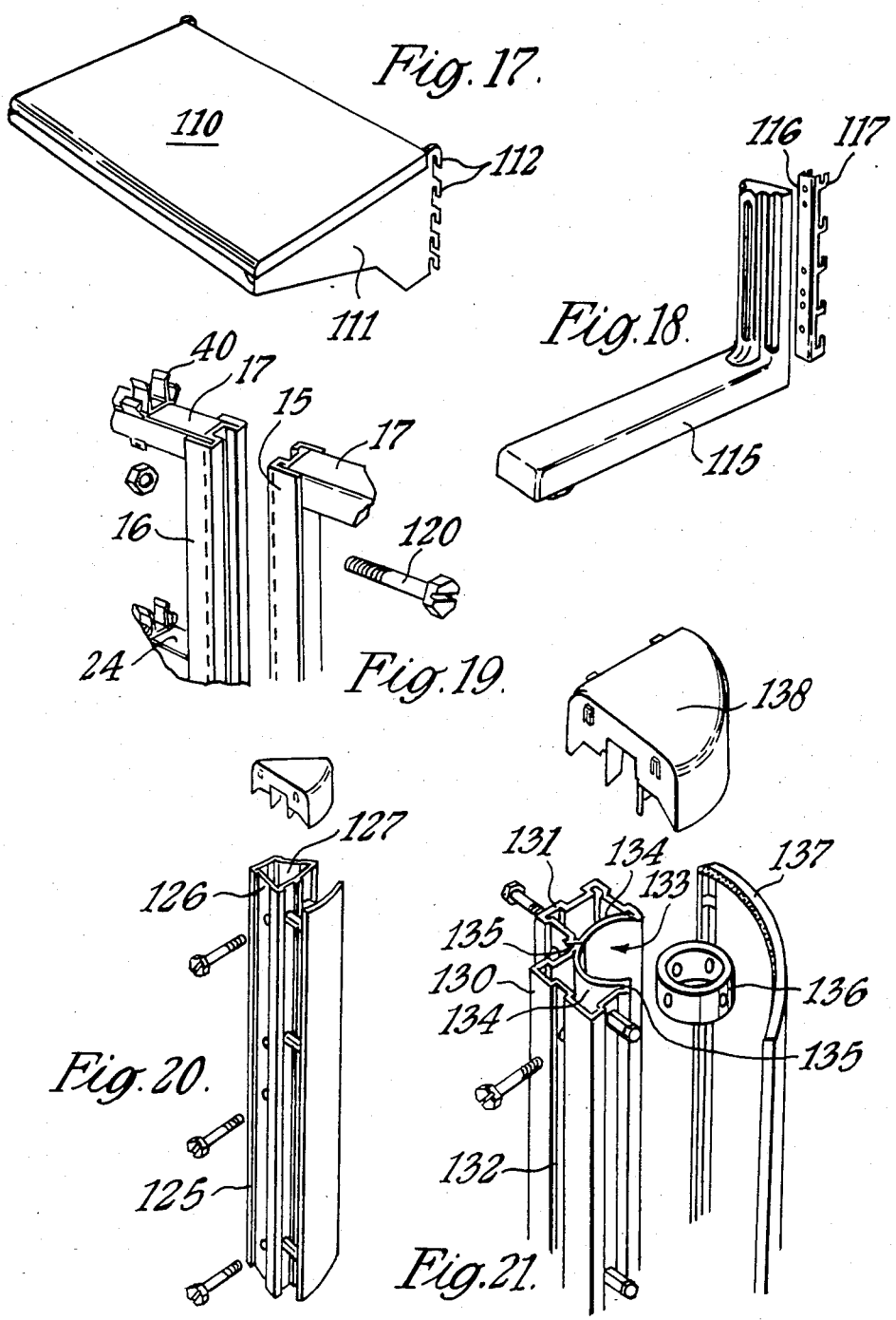

OFFICE SCREENS AND PARTITIONS

This application is a continuation-in-part of my U.S. patent application Ser. No. 751,046 dated July 2, 1985, now abandoned.

BACKGROUND TO THE INVENTION

This invention relates to a screen for forming an office partition by connection of adjoining screens.

FIELD OF THE INVENTION

For many years experts have given a great deal of thought to the problems of total office design so that staff and technology can work productively in the space available. In the USA an office furniture system emerged based on a screen with work tops and storage hung from the screen element. The American approach saved space and offered each individual his or her own panelled office. However if often lacked flexibility to meet the changes brought about by modern technology. In Europe a different system emerged independently to solve the same problems, but the end result was somewhat different. The European approach used the workstop or desk as the basic unit with screening added to give a degree of privacy. This system solved the flexibility problem but did not provide solutions for all individual office tasks. As technology development accelerated within the office it became clear that neither system was ideal. Manufacturers adapted their products to cope with the increasing power, telephone and data cabling requirements, rather than tackling the problem at source.

SUMMARY OF THE INVENTION

It is an object of the invention to provide a system that takes the advantages of each distinct approach, can be used interchangeably with free-standing desks and desks suspended on hanger brackets from the screen frame and has a simple and effective provision for passing cables at floor, desk and top capping levels.

The invention provides a screen for an office partition comprising a generally rectangular screen comprising:

a load-carrying frame forming a section of an eventual partition and defined by first and second posts along side edges of the screen and by a plurality of cross-rails extending between and connected to the posts with at least a top and a bottom cross-rail along top and bottom edges of the screen;

at least one cladding panel spanning between the posts and between pairs of the cross-rails; and at least one cable carrier in the frame defining at least one cable channel open from above, said carrier extending generally parallel to the cross-rails between the first and second posts and with the sides of the cable channel having openings at the ends of the carrier giving cable access across an outer face of the posts to the channel in the line thereof;

clip means demountably supporting the cladding panel at an outward clearance from the outer face of the posts so that cables laid in the cable carrier can pass therefrom across the outer face of the posts to adjoining portions of the eventual partition.

When a partition is assembled from the screens it is an advantage of this invention that a cable can be laid along the partition simply by removing cladding panels from one face and laying the cable in the cable carrier—the cable does not have to be threaded through apertures in the posts. Cable entry and egress is between the cladding panels or between a cladding panel and an adjacent capping strip.

DESCRIPTION OF PREFERRED FEATURES

Advantageously the screen has four cross-rails and one face of the screen has three demountable cladding panels with a middle one of said cladding panels being smaller than the other panels and being located at a vertical position just above the height of a desk to be stood against or to be fitted to the panel. In such a screen all services may be run at desk-top height clear of desk tops and upper or lower storage cabinets hung from or placed against the screen. A partition may be formed by interconnection of a multiplicity of screens of this kind, providing a combination of cable lay-in from one side with desk-height cable access.

It is desirable that the load carrying frame should be capable of being shipped in knurled-down form and assembled on site by simply being bolted together, but should provide a rigid structure. Preferably the top and bottom rails are of box-section and terminate in outturned vertical location members of channel section, the posts are of channel section with a smaller inturned channel formation along the web so that they assume a W-profile with side walls thereof apertured at intervals to receive suspension or support brackets and with the web channel blocking light passing between apertures of the opposed walls, the location members fitting between the web channel and the side walls and the posts and cross-rails being secured together by fixing bolts through the web channel and through the locating members with heads thereof concealed within the web channels.

Advantageously the cladding panels are bottom hinged and can be released along their top edges to tilt outwardly to a stable inclined attitude giving access to the interior space of the screen. Accordingly the cladding panel has first clip means adjacent its bottom edge permitting the panel to hinge outwardly about an axis parallel to the cross-rails and including tongue means engaging in slot means and retaining the panel on the first clip means until the panel is demounted by being lifted therefrom and has towards its top edge second clip means defined by catch means on one of said panel and said frame resiliently engaging latch means on the other of said panel and said frame to hold the panel against the frame. The bottom edge of the cladding panel extends beneath the first clip means and when the panel is tilted butts against a lower cross-rail spanned by the panel to hold the panel in a stable attitude. The first clip means then comprises:

a latch member attached to a top face of a cross-rail and including upstanding wall means, tongue means inclined upwardly and outwardly with respect to the frame and having an inner face that meets an outer face of the wall means at an angulation, and hook means at the tip of the tongue means and inclined inwardly and upwardly with respect to the frame; and a catch member on a blind face of the panel having a side spaced apart from the panel to define therewith a space with the base of the catch member leading into the hollow space and with portions of the side defining a slot leading into the space and adjacent to but spaced from a lower edge of the side, said side demountably fitting between the tongue means and the wall means in attitudes of the panel such that the lower edge of the panel is clear of the cross-rail and pivoting in the angulation about the lower of the edge side, and on tilting the panel to attitudes where its lower edge abuts the cross-rail the hook means entering the slot and the catch member travelling along the latch member until the tongue reaches a lower edge of the slot.

The second clip means may be defined by a catch member attached to a bottom face of a cross-rail and having tongue means extending outwardly from the cross-rail with a recessed region behind its tip and a latch assembly including a member on a blind face of the panel having a side spaced apart from the panel to define therewith a hollow space with portions of the side defining a slot leading into the space, and resilient clip means retainined in the slot having finger means that is displaced by the tip of the tongue as the tongue enters the slot and snaps into the recessed region behind the tip.

The blind face of the or each cladding panel preferably has a generally rectangular reinforcing frame attached thereto, said frame being defined by upright and horizontal members of top hat section, catch members of the first clip means being defined by upper regions of the upright members and said member of said latch assembly of said second clip means being defined by lower regions of the upright members.

The cable carriers may be of electrically insulating material, may depend from a frame rail and may have the capability of nesting. Stub cable carriers may be provided for coiling lengths of excess cable. Each cable carrier may be of generally chanel section with a central upstanding wall bifurcated along its top edge to define a hanger and with a bifurcated formation depending from its lower face to define a rail, the hanger snap engaging either with rail formations on the undersides of the catches or with the ail of an overlying cable carrier to suspend said cable carrier. The cable carrier is preferably formed with out-turned bifurcations defining the rail and inturned bifurcations defining the hanger. The top face of the web of hinge clip means fitted to the top face of the cross-rails may be formed with upstanding internally barbed walls into which the rail of a cable carrier fits.

The walls of the hinge clip means may be enlarged along their top edges and a capping strip of channel section may be held with its walls downward by means of clip formations on the lower face of the web that snap engage said hinge clip walls. The capping strip may further comprise inturned ribs on its walls that slideably engage retaining clips of channel section adapted for bolting to end posts whereby the capping strip serves for both top and end capping a screen.

The versatility and part economy of the above arrangement is particularly noticeable with the hinge clips being used in up to three roles and with the catches also serving to support the cable carriers.

BRIEF DESCRIPTION OF THE DRAWINGS

Embodiments of the invention will now be described with reference to the accompanying drawings, in which:

FIG. 2 shows a framework for a screen having one panel on each face; and

FIG. 3 shows a framework for a screen with three panels on each face;

FIG. 4 shows a pair of posts;

FIG. 5a is a perspective view of a top rail; and

FIG. 5b is a perspective view of a bottom rail forming part of the internal structure of a panel;

FIG. 6 is a perspective view of a cable carrier that fits into the frame structure;

FIG. 8 is an exploded view of an end finishing post and the adjoining screen frame structure;

FIG. 14 is a perspective view of a latch that engages with the catch of FIG. 10;

FIG. 15 is an enlarged diagrammatic section of part of a screen showing a panel to one face thereof in an upright attitude and a panel to the other face thereof in a tilted attitude;

FIG. 16 is a fragmentary sectional view of the screen framework showing attachment of a cross-rail to a post;

FIGS. 17 and 18 are perspective views of a worktop unit and a support foot which are accessories that can clip into posts of the screen framework;

FIG. 19 is a fragmentary perspective view of frameworks of adjoining frames showing the establishment of a straight connection therebetween;

FIGS. 20 and 21 are perspective views of accessories permitting angled connections to be established between frames.

DETAILED DESCRIPTION OF PREFERRED EMBODIMENT

Figure 1:
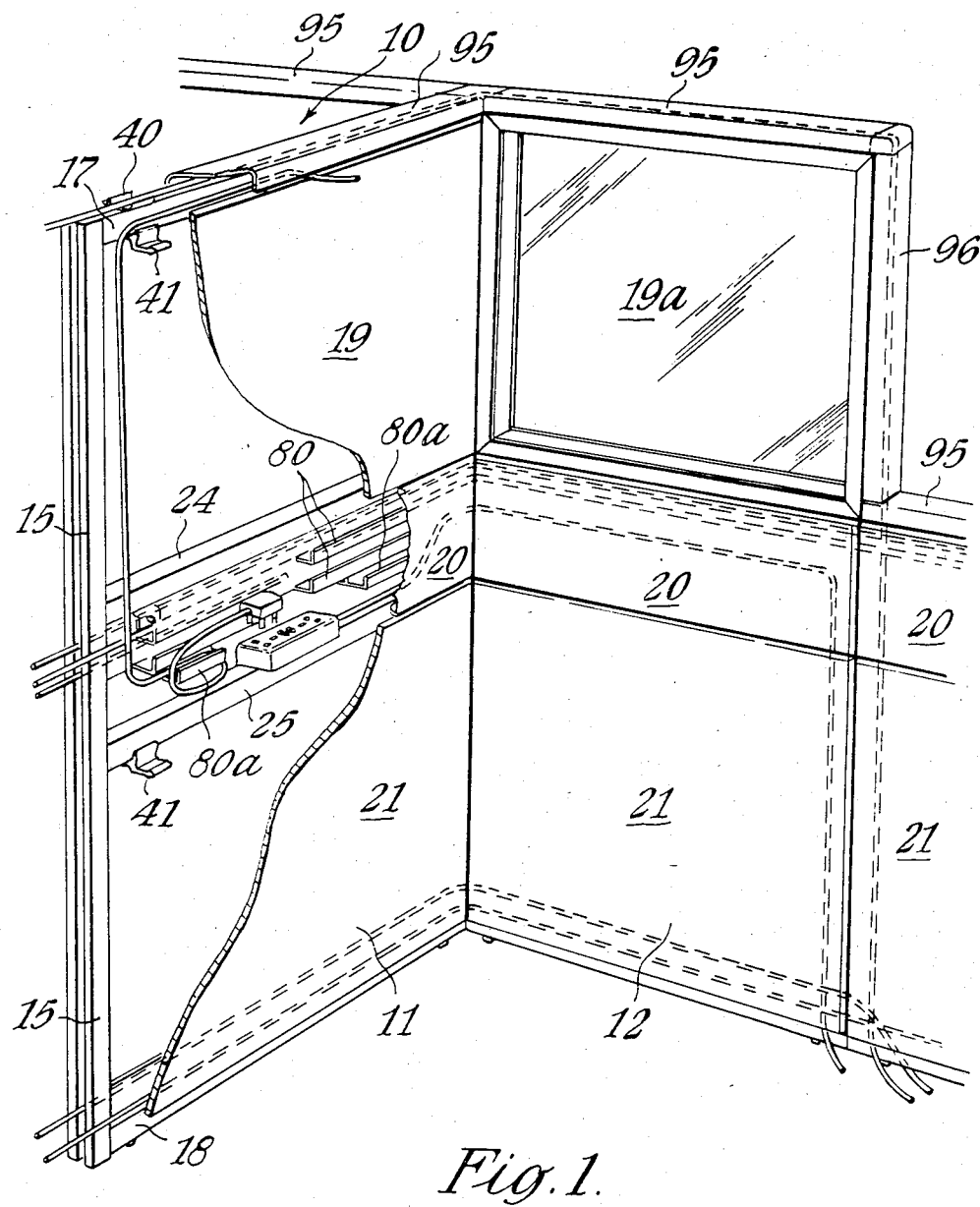
FIG. 1 shows three screens according to the invention forming part of an orifice partition, one of which is partly cut-away to reveal its internal structure, illustrative cable paths through the partition being marked.

In FIG. 1 a group of screens 10–12 is shown forming part of a modular office partition. The screens may be connected together end-to-end in a straight connection, in a T-connection as illustrated, in a 4-way connection or at angles to one another. Each screen comprises a load-carrying frame structure, panels demountably clipped to the frame structure and cable carriers supported by the frame structure. The panels and capping of the screen 11 are cut-away to reveal the internal structure.

In FIGS. 1 to 3, the frame structure comprises posts 15, 16, a top rail 17 of box-section and a bottom rail 18 also of box-section. the frame of FIG. 2 has only one panel on each face, but the frame of FIG. 3 has top and bottom panels 19, 21 and a desk-level access panel 20 which is of substantially lesser height than the panels 19 or 21. The panels 19, 21 can be of opaque fabric covered board as at 19 or can be removable frames that sandwich a window as at 19a. The lower edge of access panel 20 substantially coincides with the top face of the intended desk. The panel 20 is supported at upper and lower intermediate rails 24, 25 that are also attached between posts 15 and 16. As is more clearly seen in FIGS. 4, 5a and 5b the posts 15, 16 are generally of double channel or W-section to define side walls 26, 27 and a web 28 that is folded to define a reversed auxiliary channel 29. The opposed side walls 26, 27 are formed with longitudinally spaced locating apertures 30 for hanger brackets, support brackets or other accessories as is known in the art. The channel 29 prevents light passing directly from apertures 30 in one wall 26 to the apertures 30 in the other wall 27. As is apparent from FIGS. 2 and 3 the frame is assembled with the walls 26, 27 of the posts 15, 16 facing one another. The rails 17 and 18 are provided at their ends with vertical locating members 35 that are of out-turned channel section as shown with the outwardly facing side walls of members 35 fitting one into the space between wall 26 and channel 29 and the other into the space between wall 27 and channel 29. Bolts 22 pass through fixing holes in the channel 29 and through fixing holes in the locating members 35 to assemble the frame together and their heads 23 can be concealed within the channel 29 to permit the posts 15, 16 of adjoining frames to be assembled with their webs 28 in face to face contact.

Figure 7:
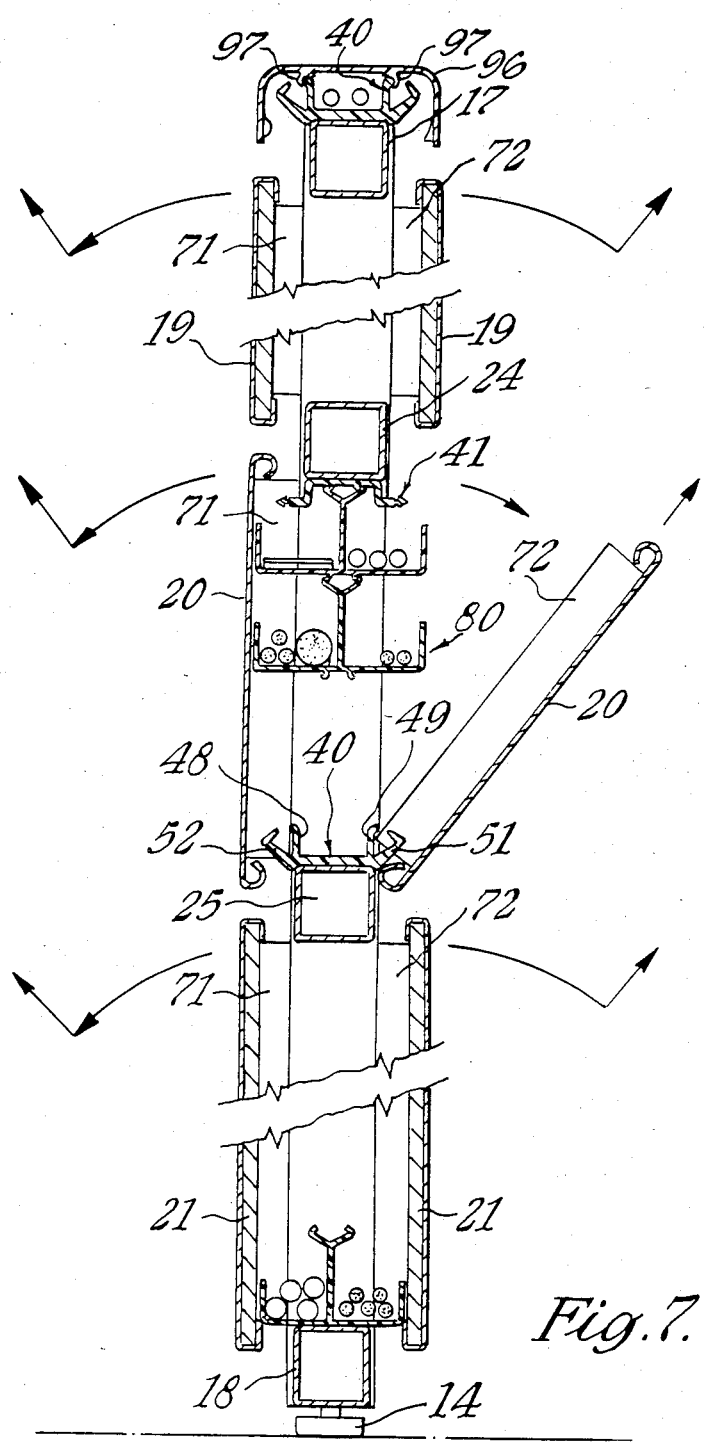
FIG. 7 is a diagrammatic vertical section of a frame.

The top rail 17 carries hinge clips 40 on its top face and catches 41 on its lower face and the bottom rail 18 carries hinge clips 40 on its top face and has ground-contacting feet 14 depending from its lower face. Each intermediate rail 24, 25 is also provided with hinge clips 40 on its top face and catches 41 on its lower face. The hinge clips 40 and catches 41 cooperate with the structure of a removable panel to enable the panel (a) to be clipped upright to the frame structure at a small outward clearance from the posts and rails 15, 16, 17, 18 and/or 24, 25 which their edges overlie and partly conceal, (b) to be unclipped and hinged obliquely outwards as in FIG. 7, and (c) to be completely removed.

Figure 9:
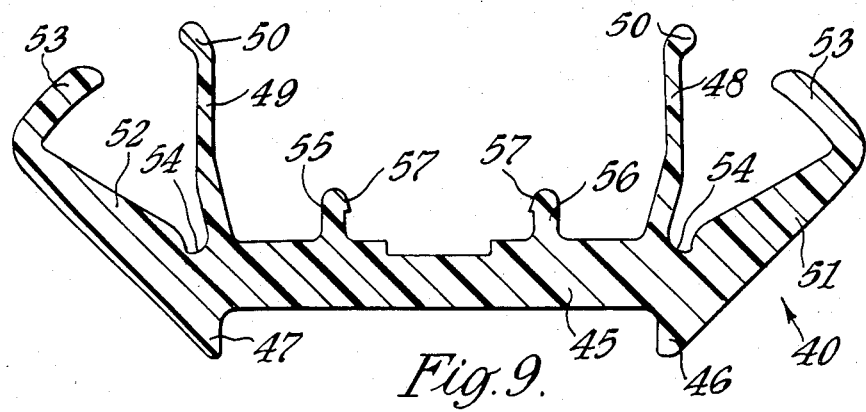
FIGS. 9 to 11 are respectively sections of a hinge clip, a catch and a cable carrier that are incorporated into a screen according to the invention.

The structure of a hinge clip 40 that provides a latch member of the first clip means is shown in FIG. 9. It is a short length of extruded aluminium formed with a web 45 formed on its lower face with depending walls 46, 47 between which is defined a channel into which the top face of a rail 17, 24,25 or 18 fits. The top face of the web 45 terminates in upstanding walls 48, 49 that when the clip is fitted in the frame are inclined outwardly at a small angle to the side planes of the frame and are formed with outward facing projections 50 along their top edges. The ends of the web 45 are also formed with upstanding tongues 51, 52 directed obliquely upwards and outwards with respect to the frame and having at their tips hook formations 53 that are directed obliquely inwards and upwards of the frame. Each tongue 51, 52 define at its base an angulation providing a hinge region 54 with the base of the wall 48, 49. The top face of the web 45 is formed with a pair of short inner walls 55, 56 formed on their inner faces with barbs 57.

Figure 10:
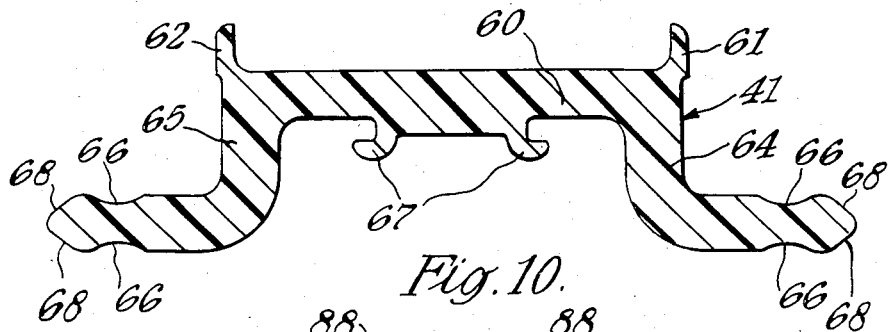

The structure of a catch 41 forming part of the second clip means is shown in FIG. 10. It comprises a web 60 whose ends are formed with upstanding ears 61, 62 that locate and receive the lower face of a rail 17, 24, 25, or 18. Depending from the web 60 are side walls 64, 65 of out-turned angular profile inwardly radiused just behind their ends at 66 to define catches for the panels and formed at their ends with nose-defining cam surfaces 68. The lower face of the web 60 is formed with an out-turned rail-defining bifurcation 67. Again the catch 41 is an aluminium extrusion.

Figures 12, 13:
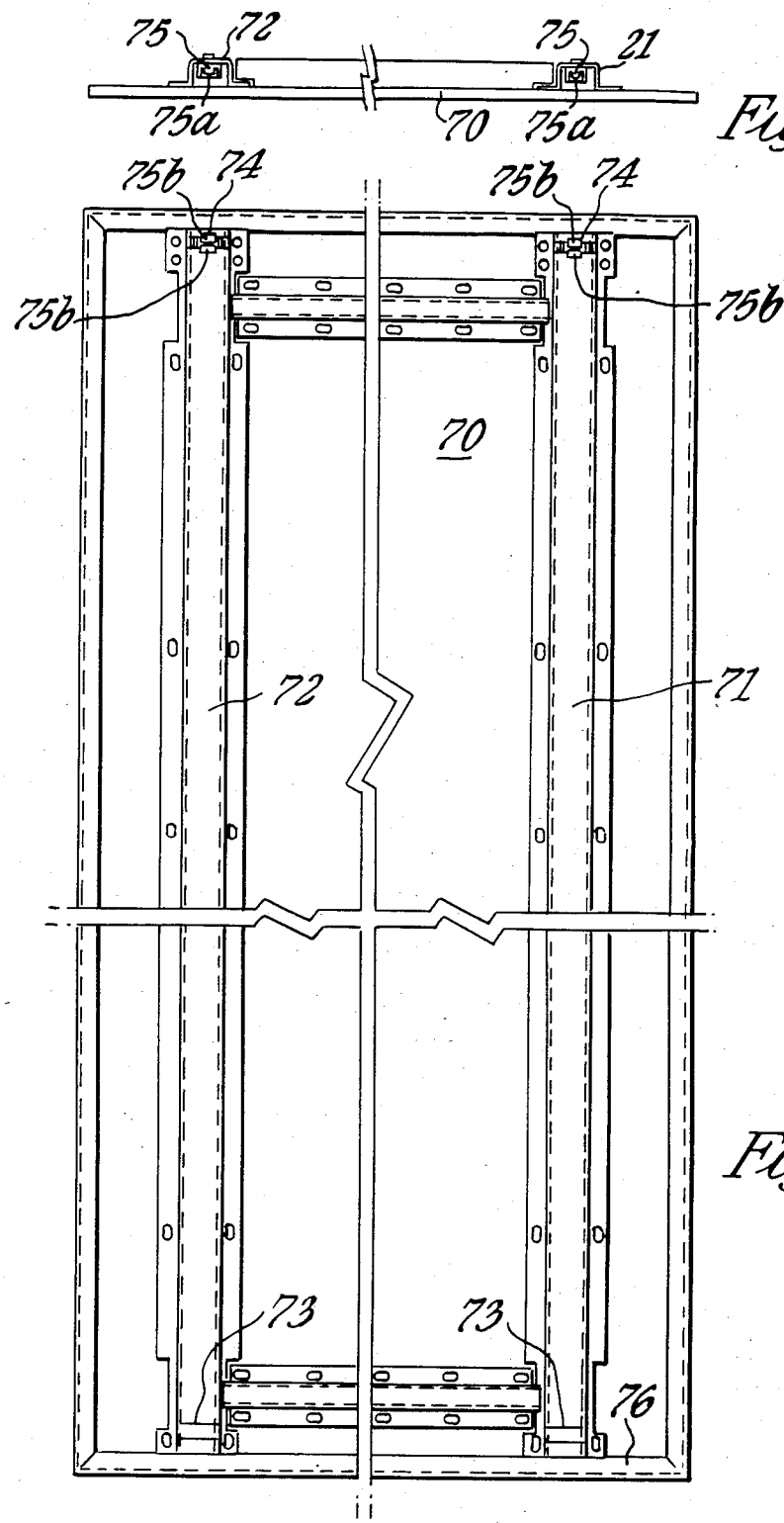
FIGS. 12 and 13 are respectively an elevation and a plan of a cladding panel for attachment to a screen according to the invention.

The reinforcing and spacing structure of a typical panel 19 or 21 is shown in FIGS. 12 and 13. The structure of a desk level panel 20 is the same and it differs only in overall dimensions. The panel body 70 is formed of foam and fabric covered board such as flaxboard provided on its blind face with a rectangular frame of top-hat section reinforcements attached thereto by suitable means. The uprights 71, 72 of the frame are positioned to conform to the hinge clips 40 and catches 41 and are formed adjacent their ends with upper slots 74 and lower slots 73 that respectively fit onto catches 41 and hinge clips 40. The lower slots 73 are plain but the upper slots 74 are formed to locate spring latches 75 (FIGS. 13, 14) which are engageable with catches 41. The face of the upright 71 or 72 that is parallel to the panel 19, 21 is spaced therefrom to define a space that is open from the base so that tongue 51 can fit therein and the lower slot 73 leads into that space, the slots 73 extending across the face of the uprights 71 or 72 and being substantially deeper than the thickness of the tongue 73. The base regions of the uprights 71, 72 with the slots 73 define the catch member of the first clip means. A panel 19, 20, 21 can be attached to the frame by introducing the faces of the uprights 71, 72 between tongue 51 or 52 and wall 48 or 49 of the hinge clip 40 so that the lower edge of the front face rests and is pivotable in the angulation 54, which is possible when the panel is upright or at less than its maximum angle of tilt. At that time the uprights 71, 72 are at the extremity of their travel downwardly into the clips 40. A rolled lower edge 79 of the panel body 70 extends beneath the uprights 71 and 72 and at larger angles of panel tilt encounters the lower cross-rail 25 that the panel 20 spans. The hooked ends 53 have now been rotated so as to enter the slots 73. As the panel 20 continues to tilt, it now fulcrums about its lower edge 79 with the uprights 71 and 72 sliding along the blind faces of tongues 52 until their end hooks 53 encounter the lower extremity of slots 73, after which further tilting is prevented. The panels 19, 20, 21 can therefore hinge out about bottom hinge means to a stable inclined attitude. Lifting the panel 20 when it is inclined disengages hook 53 from slot 73, after which the panel 20 can be removed from the frame.

The upper slots 74 are similarly spaced on the face of uprights 71 and 72 to lead into a space between the uprights and the panel and form part of a latch assembly of the second clip means. Each slot 74 contains a latch 75 which is formed from a generally rectangular piece of spring steel having a cut-out defining upper and lower tongues 75a and having folded projections 75b at its upper and lower edges. The latch 75 is deformed into a U-shape and inserted into slots 74 until projections 75b encounter the face of upright 71 or 72 after which the tendency of the latch to straighten holds it in position, and the tongues 75a are convergent and inwardly inclined of the slot 74. The horizontal limbs of side-walls 64, 65 define tongue-like catch members of the second clip means, and as they encounter and then enter the slots 74 their nose-defining cam surfaces 68 cam the tongues 75a apart until they releasably snap into the inwardly radiused regions 66. Thus the panel 20 can be rotated on the lower clip means that includes the hinge clips 40 until it reaches an upright attitude where the upper clip means that includes the catches 41 engage into and are retained in the slots 74, holding the panel 20 upright until released by pulling along its top edge.

Figure 11:
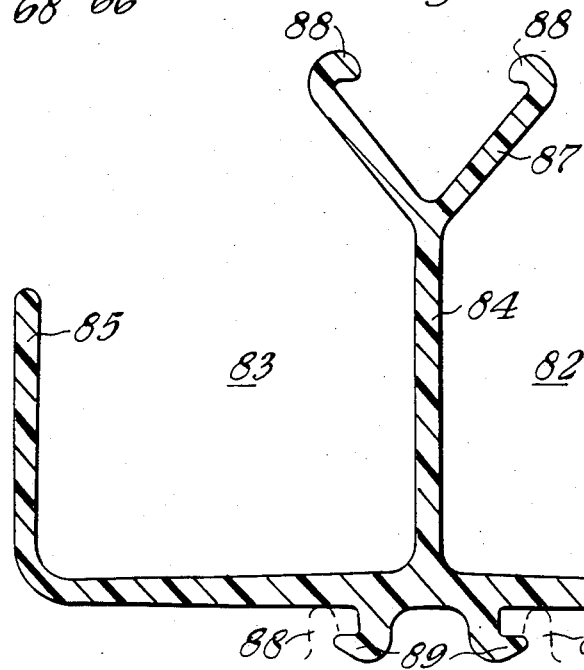

A cable tray 80 is shown in FIGS. 6 and 11. It is a generally channel-section extrusion in rigid polyvinyl chloride or other electrically insulating rigid plastics material and is of generally channel section with a tray portion 81 divided into horizontally spaced longitudinal compartments 82, 83 by a partition 84 and bounded by lateral walls 85, 86. The partition 84 is bifurcated to define a hanger 87 whose extremities are inturned at 88 and the lower face of the tray portion 81 carries outwardly cranked ribs 89 defining a longitudinal support rail. The hanger 87 can (a) snap onto the rail-defining bifurcation 67 of the pair of catches 40 on one of the rails or (b) it can snap onto the support rail defined by ribs 89 of an overlying cable carrier to permit the cable carriers to stack. As apparent from FIG. 1, a typical configuration at desk level comprises a pair of stacked substantially full length cable trays 80, on the lower of which is one or two stub cable trays 80a for coiling lengths of excess cable. The cable trays 80 can also fit onto the hinge clips 40 of the bottom rail 18 by snap engagement of the rails 89 with the barbs 57 of the socket-defining walls 55, 56. As apparent from FIG. 6, the sidewalls and base 81, 85, 86 of the cable carriers are formed at intervals with cut-outs 90 for the cables to pass into and from the carriers 80.

The tops and sides of the panel are formed with a dual purpose aluminium extrusion of channel section defining a top cap 95 or a vertical cap 96. When used as a top cap, socket defining ribs 97 on its lower face clip onto the tips 50 of walls 48, 49 of the hinge clips. When used as a vertical cap, the arrangement of FIG. 8 is employed. An outwardly directed end post 98 is attached to the post 16. Top-hat section clips 99 are slid between flanges 100 on the side walls of the cap 96, after which the clips 99 are engaged with bolts 101 through the posts 16, 98. The outside corner is furnished by means of a plastics cap 102.

The vertical spacing of the panels 19, 20, 21 from the frame gives both horizontal and vertical cable paths e.g. for a typical three panel screen with the following horizontal paths:

(i) along the top rail 17 under the cap 95 (and 96 when required) with an outlet between the top cap 95 and the top panel 19;

(ii) under the top intermediate rail 24 with outlets above or below the access cover 20; and (iii) along the bottom rail 18 with floor access from below the panel 21.

The cables can simply be laid in the cable trays or carriers 80 and passed over the posts 15, 16 between adjacent screens thereby considerably simplifying cable installation.

FIG. 17 shows a worktop panel 110 that may be fitted to a screen such as the screen 11 just beneath the panel 20 by engagement of downwardly facing hooks 112 of fixing brackets 111 into the locating apertures 30 of the posts 15, 16. A panel-support desk is optional, and the screen 111 may equally be used in association with a free-standing desk of the proper height. Brackets such as the brackets 111 may also be used to support other accessories such as shelves and cupboards. If the panel is to stand without adjoining panels of the eventual partition at angles thereto, it may need to be stabilised by a support foot 115 such as that shown in FIG. 18 which is fitted to a bracket insert 116 having upwardly directed hooks 117 that fit into the apertures 30 of posts 15, 16.

FIG. 19 shows a straight connection between load-carrying frames of adjoining panels of a partition. Posts 15, 16 of the adjoining frames are simply placed one against the other and interconnected by bolts 120. Forming a connection between panels at 30°, 45° or 60° angles is similarly easy with the posts 15, 16 being bolted through an intermediate post 125 whose side faces 126, 127 abutting posts 15, 16 are at the correct angle. A 90° connection may be formed as illustrated in FIG. 21. An intermediate post 130, 131 is bolted to each of the posts 15, 16 of the adjoining screens. Each post 130, 131 has one side face 132 matching the side face of posts 15, 16 and its other side face 133 having a region 134 of concave arcuate profile with bevelled regions 135 to either side of the region 134. The posts 130, 131 fit together by abutment at the bevelled regions 135 and are held in position by bolt connection to rings 136. The connection is concealed by means of a cover strip 137 and cap 138. The arrangement of FIG. 1 may be used to connect three adjoining screens in a T formation or to connect four adjoining screens in an X formation, the number of intermediate posts bolted to ring 136 then being three or four. It will be understood that FIGS. 20 and 21 merely exemplify how connection may be established between adjoining screens of a partition where those screens are not in alignment and other methods of interconnection may be employed without departing from the invention.

Figure 22:
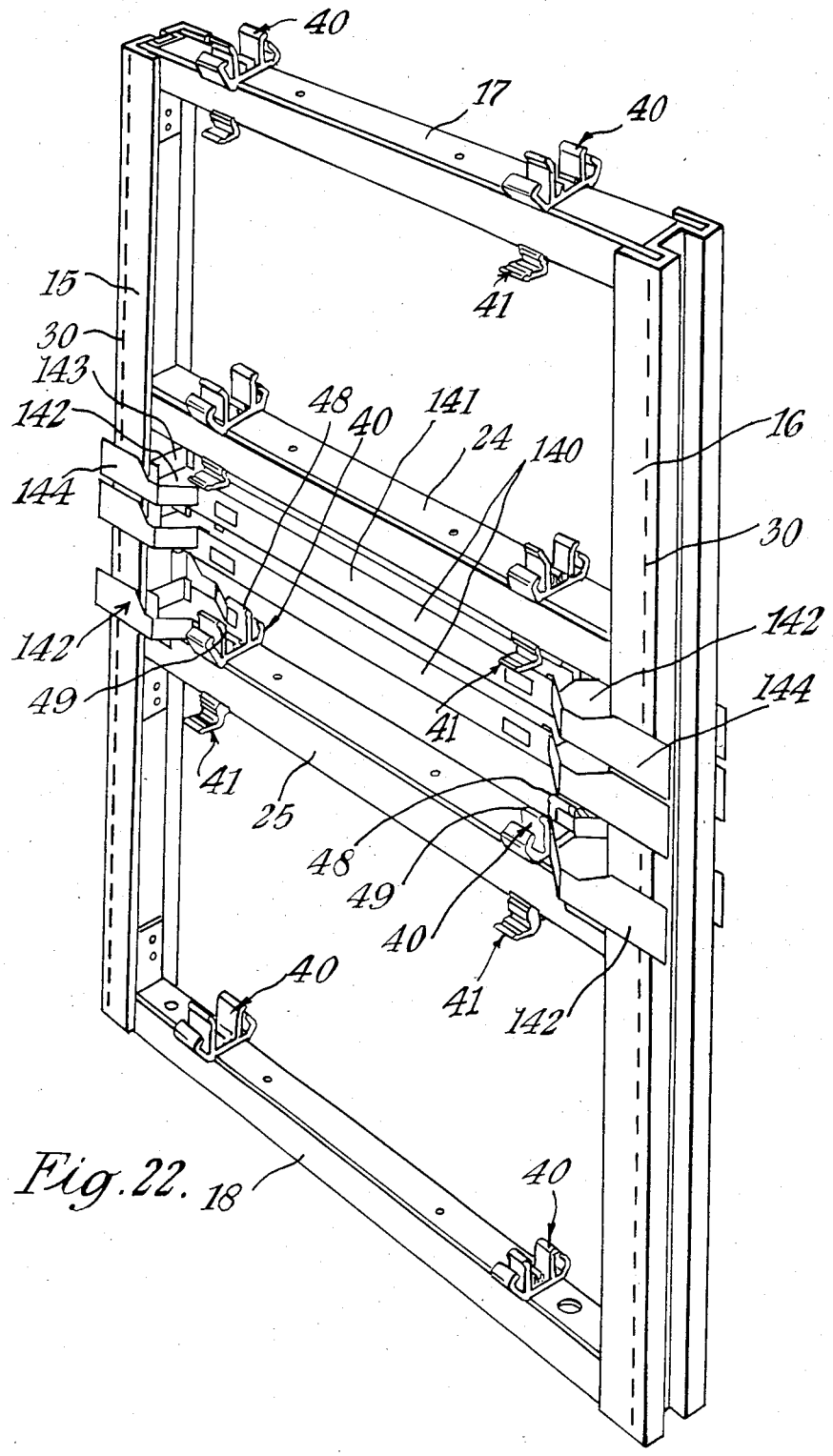
FIG. 22 is a perspective view of the screen framework showing an alternative embodiment of the cable carrier.

FIG. 22 shows an alternative form of cable tray arrangement in which metal cable trays 140 are bolted to and between the posts 15, 16. The trays 140 are of channel section but their sides 141 stop clear of the posts 15, 16 to provide for cable entry into and egress from each tray. The ends of each tray are formed with inserts 142 of plastics material that serve to insulate cables where they pass into and from the tray 140 and to guide it about the posts 15, 16, the cables being held away from posts 15, 16 by end walls 143 and being shielded where they pass over the faces of posts 15, 16 by flaps 144 forming part of the inserts 142. Each flap 144 extends a small distance beyond its respective post 15, 16 so that when posts 15, 16 of adjoining screens abut with cable trays 140 at the same level, their flaps 144 overlap, ensuring that cable passing between the flaps 144 and the posts 15, 16 will be shrouded from outside the screen. FIG. 22 shows an alternative form of cable tray with inserts 142 fitted to the ends of a cross-rail 25, the upstanding walls 48, 49 of the hinge clips 41 thereon sufficiently defining a cable channel.

It will be appreciated that modifications may be made to the embodiment described above without departing from the invention, the scope of which is defined in the appended claims.

I claim:
1. A generally rectangular screen comprising:
   a load-carrying frame forming a section of an eventual partition and defined by first and second posts along side edges of the screen and by a plurality of cross-rails extending between and connected to the posts with at least a top and a bottom cross-rail along top and bottom edges of the screen;
   at least one cladding panel spanning between the posts and between pairs of the cross-rails; and
   at least one cable carrier in the frame defining at least one cable channel open from above, said carrier extending generally parallel to the cross-rails between the first and second posts and with the sides of the cable channel having openings at the ends of the carrier giving cable access across an outer face of the posts to the channel in the line thereof;
   clip means demountably supporting the cladding panel at an outward clearance from the outer face of the posts so that cables laid in the cable carrier can pass therefrom across the outer face of the posts to adjoining portions of the eventual partition.

2. A screen according to claim 1, wherein there are three cross-rails and one face of the screen has two demountable cladding panels.

3. A screen according to claim 1, wherein at least the top and bottom cross-rails are of box-section and terminate in out-turned vertical location members of channel section, the posts are of channel section with a smaller inturned channel formation along the web so that they assume a W-profile with side walls thereof apertured at intervals to receive suspension or support brackets and with the web channel blocking light passing between apertures of the opposed walls, the location members fitting between the web channel and the side walls and the posts and cross-rails being secured together by fixing bolts through the web channel and through the locating members with heads thereof concealed within the web channels.

4. A screen according to claim 1, wherein there are four cross-rails and one face of the screen has three demountable cladding panels with a middle one of said cladding panels being smaller than the other panels and being located at a vertical position just above the height of a desk to be stood against or to be fitted to the panel.

5. A partition formed by interconnection of a multiplicity of adjoining screens as claimed in claim 4.

6. A screen according to claim 1, wherein each cable carrier comprises a metal body attached to the posts and plastics guides at the ends of the body defining the openings and having flaps that extend over the posts to shield cables passing over the outer faces thereof.

7. A screen according to claim 6, wherein each flap extends beyond its respective post so that flaps of cable carriers of adjoining screens of the eventual partition can overlap.

8. A screen according to claim 1, wherein a first cable carrier depends from a rail and extends therealong between the posts.

9. A screen according to claim 8, wherein a second cable carrier depends from the first cable carrier.

10. A screen according to claim 8, wherein there depends from the cable carrier one or more stub cable carriers for coiling excess cable.

11. A screen according to claim 8, wherein the cable carrier is of generally channel section with a central upstanding wall bifurcated along its top edge to define a hanger and with a bifurcated formation depending from its lower face to define a rail, the hanger snap engaging with a suspension rail formation under the cross-rail.

12. A screen according to claim 11, wherein each cable carrier is formed with out-turned bifurcations defining a suspension rail formation and inturned bifurcations defining the hanger.

13. A screen according to claim 8, wherein the suspension rail formation fits between upstanding internally barbed walls of clip means on which the cable carrier may be located.

14. A screen according to claim 8, wherein the sides of the cable carriers have cut-outs at intervals along their length to allow cables to pass therefrom.

15. A screen according to claim 14, wherein the cable carriers are formed of electrically insulating material.

16. A screen according to claim 15, wherein the cable carriers are in extrusion in rigid polyvinyl chloride.

17. A screen according to claim 1, wherein the cladding panel has first clip means adjacent its bottom edge permitting the panel to hinge outwardly about an axis parallel to the cross-rails and including tongue means engaging in slot means and retaining the panel on the first clip means until the panel is demounted by being lifted therefrom and has towards its top edge second clip means defined by catch means on one of said panel and said frame resiliently engaging latch means on the other of said panel and said frame to hold the panel against the frame.

18. A screen according to claim 17, wherein the bottom edge of the cladding panel extends beneath the first clip means and when the panel is tilted butts against a lower cross-rail spanned by the panel to hold the panel in a stable attitude.

19. A screen according to claim 18, wherein the first clip means comprises:
 a latch member attached to a top face of a cross-rail and including upstanding wall means, tongue means inclined upwardly and outwardly with respect to the frame and having an inner face that meets an outer face of the wall means at an angulation, and hook means at the tip of the tongue means and inclined inwardly and upwardly with respect to the frame; and
 a catch member on a blind face of the panel having a side spaced apart from the panel to define therewith a space with the base of the catch member leading into the hollow space and with portions of the side defining a slot leading into the space and adjacent to but spaced from a lower edge of the side, said side demountably fitting between the tongue means and the wall means in attitudes of the panel such that the lower edge of the panel is clear of the cross-rail and pivoting in the angulation about the lower of the edge side, and on tilting the panel to attitudes where its lower edge abuts the cross-rail the hook means entering the slot and the catch member travelling along the latch member until the tongue reaches a lower edge of the slot.

20. A screen according to claim 19, wherein the second clip means is defined by a catch member attached to a bottom face of a cross-rail and having tongue means extending outwardly from the cross-rail with a recessed region behind its tip and a latch assembly including a member on a blind face of the panel having a side spaced apart from the panel to define therewith a hollow space with portions of the side defining a slot leading into the space, and resilient clip means retainined in the slot having finger means that is displaced by the tip of the tongue as the tongue enters the slot and snaps into the recessed region behind the tip.

21. A screen according to claim 20, wherein the catch member comprises a web extending across the underside of a cross-rail and bounded at each end by a pair of upstanding walls defining a channel into which the cross-rail fits and by a pair of depending walls terminating in out-turned portions defining the tongue means.

22. A screen according to claim 20, wherein the blind face of the panel has a generally rectangular reinforcing frame attached thereto, said frame being defined by upright and horizontal members of top hat section, catch members of the first clip means being defined by upper regions of the upright members and said member of said latch assembly of said second clip means being defined by lower regions of the upright members.

23. A screen according to claim 19, wherein the latch member has a web that extends across the cross-rail from one face of the frame to the other, means on a lower face of the web defines a recess that locates onto the rail and wall means, tongue means and hook means occur at each end of the web.

24. A screen according to claim 23, wherein the latch members occur in pairs on the cross-rails, each latch member being positioned towards one or other of the posts.

25. A screen according to claim 23, wherein the walls of the latch member are enlarged along their top edges and a capping strip of channel section is held with its walls downward by means of clip formations on the lower face of the web of the capping strip that snap engage the walls of the latch member.

26. A screen according to claim 25, wherein the capping strip further comprises inturned ribs on its walls that slideably engage retaining clips of channel section adapted for bolting to end posts whereby the capping strip serves for both top and end capping a screen.

* * * * *